(12) United States Patent
Dai et al.

(10) Patent No.: US 12,314,836 B2
(45) Date of Patent: May 27, 2025

(54) OPTICAL DIFFRACTIVE PROCESSING UNIT

(71) Applicant: Tsinghua University, Beijing (CN)

(72) Inventors: Qionghai Dai, Beijing (CN);
Tiankuang Zhou, Beijing (CN); Xing Lin, Beijing (CN); Jiamin Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 877 days.

(21) Appl. No.: 17/517,085

(22) Filed: Nov. 2, 2021

(65) Prior Publication Data
US 2022/0164634 A1    May 26, 2022

(30) Foreign Application Priority Data
Nov. 25, 2020   (CN) .......................... 202011339778.7

(51) Int. Cl.
*G06N 3/04*     (2023.01)
*G06N 3/045*    (2023.01)
*G06N 3/067*    (2006.01)
*G06N 20/00*    (2019.01)

(52) U.S. Cl.
CPC ............. *G06N 3/045* (2023.01); *G06N 3/067* (2013.01); *G06N 20/00* (2019.01)

(58) Field of Classification Search
None
See application file for complete search history.

(56) References Cited

U.S. PATENT DOCUMENTS

2021/0142170 A1*   5/2021   Ozcan ................ G02B 27/4205

FOREIGN PATENT DOCUMENTS

| WO | WO-2020101863 A2 * | 5/2020 | |
|----|---------------------|--------|----------|
| WO | WO-2021237170 A1 * | 11/2021 | ............. G06N 3/067 |
| WO | WO-2022056422 A1 * | 3/2022 | |

* cited by examiner

*Primary Examiner* — Thomas D Lee
(74) *Attorney, Agent, or Firm* — Hodgson Russ LLP

(57) ABSTRACT

An optical diffractive processing unit includes input nodes, output nodes; and neurons. The neurons are connected to the input nodes through optical diffractions. Weights of connection strength of the neurons are determined based on diffractive modulation. Each optoelectronic neuron is configured to perform an optical field summation of weighted inputs and generate a unit output by applying a complex activation to an optical field occurring naturally in a photoelectronic conversion. Each neuron is a programmable device.

9 Claims, 20 Drawing Sheets

| Network architecture | | model accuracy (%) | experimental accuracy (%) | computing rate (TOPs/s) | computing energy efficiency (TOPs/J) | system energy efficiency (TOPs/J) |
|---|---|---|---|---|---|---|
| D-NN | | 97.6% | 96.0% | 133.4 | 2446.1 | 2.889 |
| D-NIN-1 (↔) | | 99.0% | 96.8% | 133.4 | ~1514.0 | 2.887 |
| D-RNN | Moano | 100.0% | 96.7% | 270.5 | 2348.0 | 5.855 |
| | KTH | 94.4% | 94.4% | 270.5 | 2316.4 | 5.834 |
| D-NN↔D-RNN | Moano | — | 100.0% | 270.5 | 2522.3 | 5.855 |
| | KTH | — | 96.3% | 270.5 | 2281.6 | 5.853 |

FIG. 5

OPTICAL DIFFRACTIVE PROCESSING UNIT

CROSS REFERENCE TO RELATED APPLICATION

This application claims priority and benefits to Chinese Application No. 202011339778.7, filed on Nov. 25, 2020, the entire content of which is incorporated herein by reference.

TECHNICAL FIELD

The disclosure relates to a field of photoelectric computation and machine learning technologies, particularly to an optical diffractive processing unit.

BACKGROUND

Machine learning has made great progress in classifying, recognizing, and detecting speech and images. At present, mainstream platforms of the machine learning are all based on electronics. As manufacture process of the electronics is gradually approaching its limit, energy efficiency has reached unsustainably growth. In addition, deep learning technology based on electrons faces restrictions, such as long training time and limited computing architecture. Therefore, implementations of a next generation of the machine learning are studied.

SUMMARY

In one embodiment, an optical diffractive processing unit is provided. The optical diffractive processing unit includes input nodes; output nodes; and neurons. The neurons are connected to the input nodes through optical diffractions. Weights of connection strength of the neurons are determined based on diffractive modulation. Each optoelectronic neuron is configured to perform an optical field summation of weighted inputs and generate a unit output by applying a complex activation to an optical field occurring naturally in a photoelectronic conversion. The neurons are formed by a programmable device. The programmable device includes an optical neural network containing a digital micromirror device, a spatial light modulator, and a photodetector. The digital micromirror device is configured to provide a high optical contrast for information coding. The spatial light modulator is configured to perform the diffractive modulation. Weighted connections between the input nodes and the neurons are implemented by free-space optical diffraction. A receiving field of each neuron is determined by an amount of diffraction from a plane of the spatial light modulator to a plane of the photodetector. The photodetector is configured to implement the optical field summation and the complex activation.

The additional aspects and advantages of the disclosure will be given in the following description, and some will become obvious from the following description, or be understood through the practice of the disclosure.

BRIEF DESCRIPTION OF THE DRAWINGS

The above and/or additional aspects and advantages of the present invention will become obvious and easy to understand from the following description of the embodiments in conjunction with the accompanying drawings, in which:

FIG. 5 is a schematic diagram illustrating system performances of DPU on different computational tasks on different datasets according to embodiments of the disclosure.

DETAILED DESCRIPTION

Figure 1A:
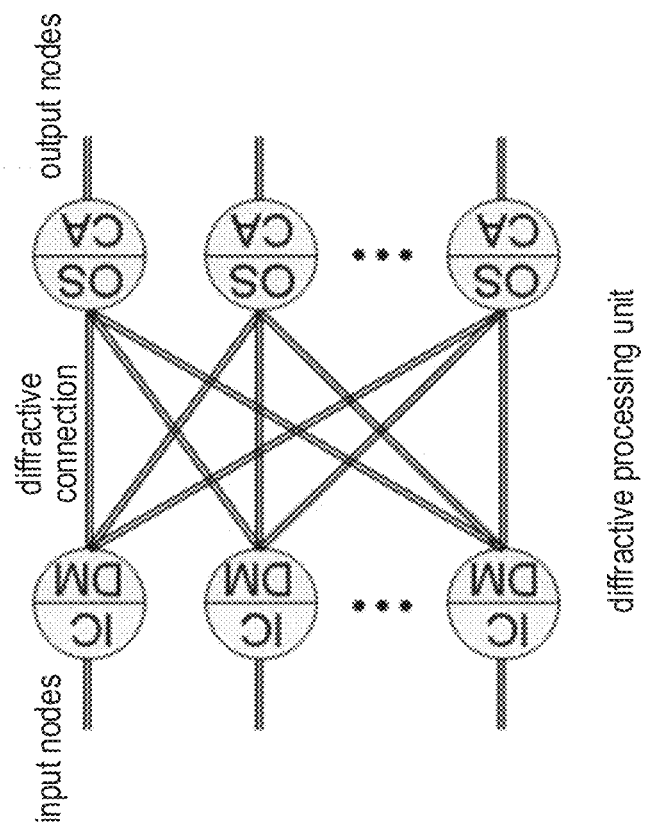
FIG. 1A is a schematic diagram illustrating a design of a diffractive processing unit (DPU) according to embodiments of the disclosure.

Embodiments of the disclosure will be described in detail below. Examples of the embodiments are shown in the accompanying drawings, in which the same or similar reference numerals indicate the same or similar elements or elements with the same or similar functions. The embodiments described below with reference to the accompanying drawings are exemplary, and are intended to explain the disclosure, but should not be construed as limiting the disclosure.

In order to make the content of the disclosure clear and easy understand, the content of the disclosure will be described in detail below with reference to the following embodiments, drawings, and tables.

In recent years, a variety of optical computing architectures have been proposed, including optical computing based on optical coherence and optical diffraction. However, the existing optical computing faces contradiction between programmability and large-scale computational operations.

Embodiments of the disclosure provide an optical diffractive processing unit, which has extensive properties and large-scale computing advantages.

The optical diffractive processing unit includes input nodes, output nodes; and neurons.

The neurons are connected to the input nodes through optical diffractions. Weights of connection strength of the neurons are determined based on diffractive modulation.

Each optoelectronic neuron is configured to perform an optical field summation of weighted inputs and generate a unit output by applying a complex activation to an optical field occurring naturally in a photoelectronic conversion.

The neurons are formed by a programmable device. The programmable device includes an optical neural network containing a digital micromirror device, a spatial light modulator and a photodetector.

The digital micromirror device is configured to provide a high optical contrast for information coding.

The spatial light modulator is configured to perform the diffractive modulation. Weighted connections between the input nodes and the neurons are implemented by free-space optical diffraction, and a receiving field of each neuron is determined by an amount of diffraction from a plane of the spatial light modulator to a plane of the photodetector.

The photodetector is configured to implement the optical field summation and the complex activation.

In some examples, the optical neural network further includes multiple single-layer diffractive layer. Each single-layer diffractive layer includes an input coding layer, a diffractive connection layer, an optical summation layer, and an optical non-linearity layer.

In some examples, the input coding layer is implemented by a programmable input circuit configured to encode input data into incident light. Physical dimensions of encoding include one or more of amplitude encoding and phase encoding, and an encoding type includes one or more of discrete encoding and continuous encoding.

In some examples, the diffractive connection layer is implemented by optical diffraction.

In some examples, the optical summation layer is implemented by optical coherence.

In some examples, the optical non-linearity layer is implemented by a programmable detection circuit.

In some examples, the single-layer diffractive layers are connected sequentially.

In some examples, the optical neural network further includes a three-layer optoelectronic diffractive deep neural network ($D^2NN$).

In some examples, the optical neural network further includes recurrent modules. An output of each recurrent module is a recurrent state. An input of each recurrent module includes an output state of a previous recurrent module and sequential input data. Each recurrent module includes multiple states. Another diffractive neural network architecture can be connected to a recurrent neural network during an inference process.

The optical diffractive processing unit will be described in detail below.

<Optical Diffractive Processing Unit, DPU>

Figure 1B:
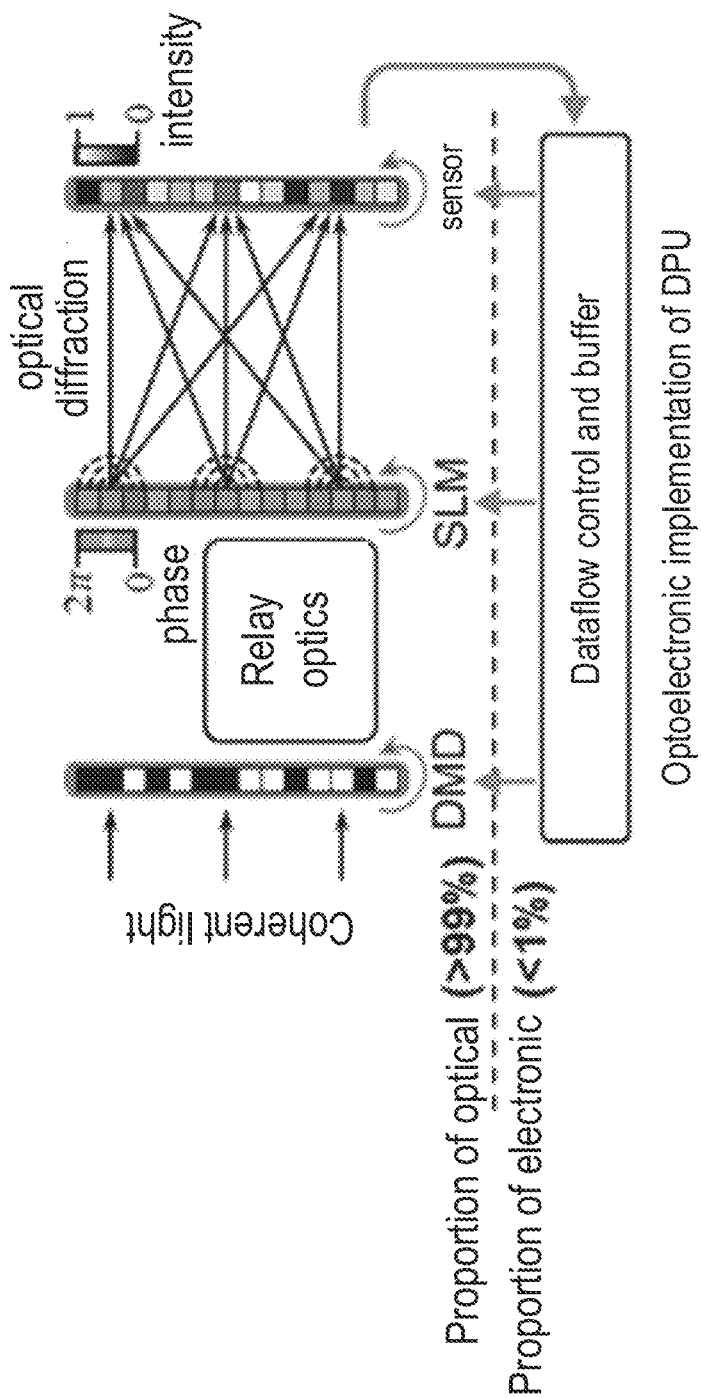
FIG. 1B is a schematic diagram illustrating an optoelectronic implementation of a DPU according to embodiments of the disclosure.

FIG. 1 is a schematic diagram illustrating principle of an optical diffractive processing unit (DPU) according to embodiments of the disclosure. As illustrated in FIG. 1, the DPU is an optoelectronic neuromorphic processor including large-scale diffractive neurons and weighted optical interconnections. The DPU represents a fundamental building block that can be programmed for establishing various types of artificial neural networks (ANNs) with high model complexity and accuracy.

In the disclosure, for processing the optical information via the diffractive neurons, unit input data can be quantized and electro-optically converted to a complex-valued optical field through an information-coding (IC) module. Different input nodes are physically connected to individual neurons through light diffractive connections (DCs), where the synaptic weights that control the strength of the connections are determined by the diffractive modulation (DM) of the wavefront. Each diffractive optoelectronic neuron performs the optical field summation (OS) of its weighted inputs, and generates a unit output by applying a complex activation (CA) function to the calculated optical field that occurs naturally in the photoelectric conversion. The unit output is transmitted to multiple output nodes.

FIG. 2 is a schematic diagram illustrating an implementing of an optical diffractive processing unit according to embodiments of the disclosure. As illustrated in FIG. 2, the diffractive neuron can be realized by a programmable device. In detail, programmable optoelectronic devices with a high data throughput, that is, on the order of a gigabit per second, can be adopted to implement the DPU that allows high-speed neural network configurations and achieves video-rate inference capabilities. In this case, the system proposed in the disclosure is designed to process large-scale visual signals that feed in images and videos. Thus, a digital micromirror device (DMD) and a spatial light modulator (SLM) are selected as optical modulators, and a complementary metal-oxide-semiconductor (CMOS) sensor is used as the photodetector (the sensor of FIG. 2).

The DMD can provide a high optical contrast for information coding (IC), which helps the system calibration and optical signal processing. The DMD encodes the binary unit input into the amplitude of coherent optical field. In the disclosure, the phase distribution is modulated by the phase SLM to achieve diffractive modulation (DM). The diffractive connections (DCs) between the input nodes and the artificial neurons are implemented by free-space optical diffraction, where a receiving field of each neuron is determined by an amount of diffraction from a SLM plane to a sensor plane. In some embodiments, electro-optical conversion characteristics of the CMOS pixels are used to realize functions of the artificial neurons (i.e., the optical field summation (OS) and complex activation (CA)), and efficiently generate the unit output. The photoelectric effect is used to measure the intensity of the incident optical field, preparation of non-linear optical materials is avoided and the complexity of the system is reduced due to the CA function. By controlling and buffering the massively parallel optoelectronic dataflow through the electronic signals, the DPU is allowed to be temporally multiplexed and programmed for customizing different types of optical neural network (ONN) architecture.

<Adaptive Training>

The effectiveness of an adaptive training approach and the functionality of the DPU are validated by constructing an optoelectronic diffractive deep neural network ($D^2NN$) for classifying the MNIST (Modified National Institute of Standards and Technology) handwritten digits. The structure of the $D^2NN$ is illustrated in FIG. 2A.

Based on numerical simulation, compared with the electronic computing, the totally-optical $D^2NN$ model can classify the MNIST database with higher model accuracy. However, the difficulty of experiments comes from defects of the physical system, such as layer misalignment, optical aberrations, and manufacturing errors. These defects inevitably degrade the performance of the computer-designed network model, and lead to the difference between the numerical simulation and the actual experiments. In the disclosure, by applying a measured intermediate light field output by the DPU to adaptively adjust the network parameters, the system error-induced model decrement can be effectively compensated in the photoelectric $D^2NN$. Compared with a situ training method that attempts to directly update the gradient for the system, the adaptive training method of the disclosure can correct the computer-trained model layer by layer, and has high robustness and high efficiency.

Figure 2A:
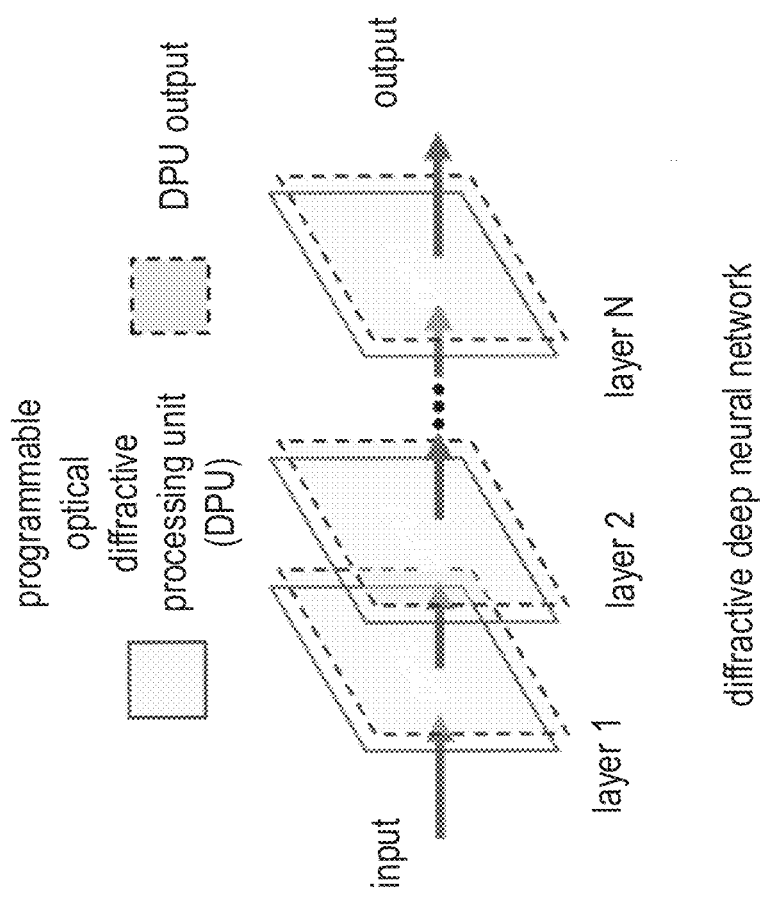
FIG. 2A is a schematic diagram illustrating a diffractive deep neural network according to embodiments of the disclosure.
Figure 2B:
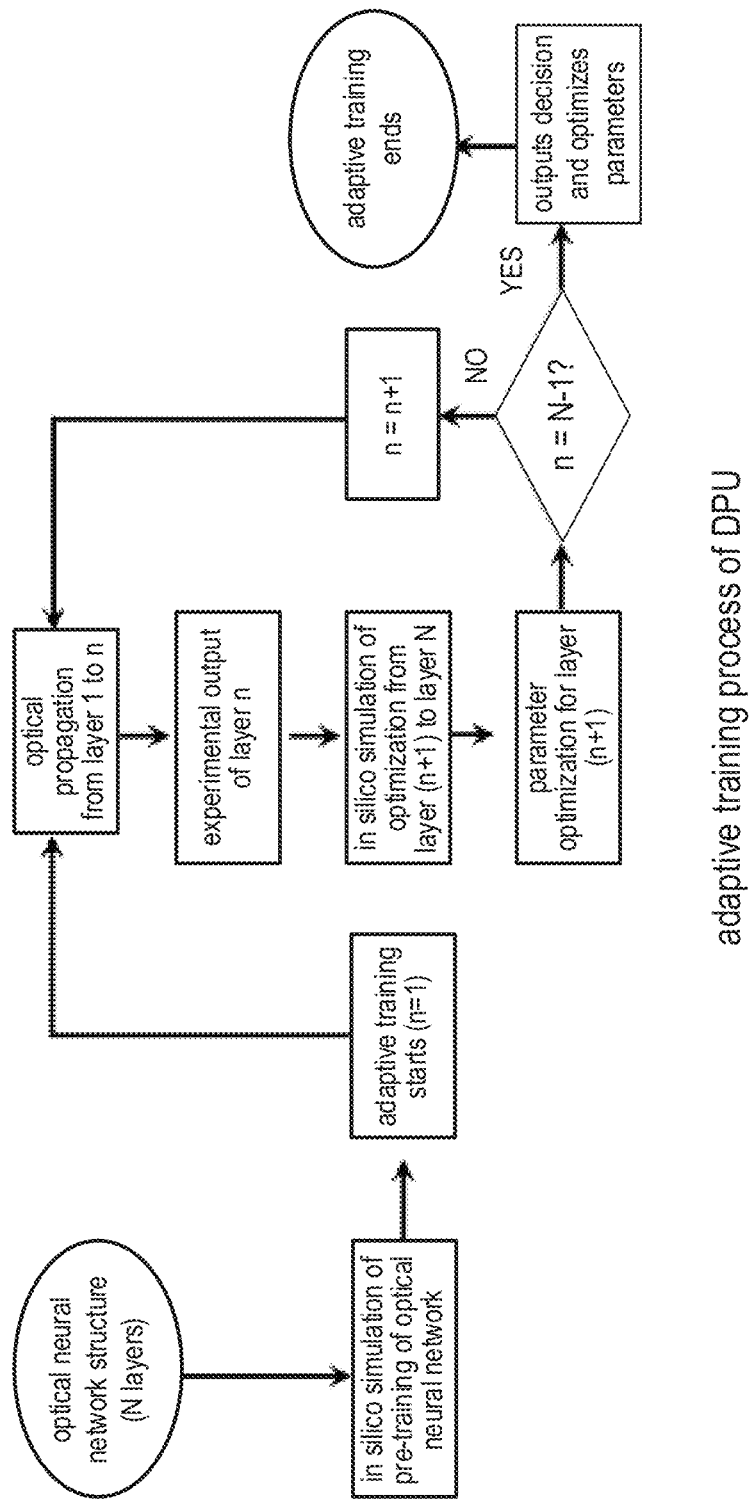
FIG. 2B is a schematic diagram illustrating an adaptive training process of a DPU according to embodiments of the disclosure.

FIG. 2B is a flowchart illustrating an adaptive training method according to embodiments of the disclosure. In the disclosure, an in silico electronic pre-training process is adopted to simulate the network model and learn parameters of the network model. In silico training has a lower training complexity than in situ training by taking advantage of existing high-performance physical models and system parameters. The pre-trained model is transferred to the optoelectronic $D^2NN$ system by deploying network structure and programming the SLM for individual PUC layers to write network parameters. As model transfer errors distort wavefront connections of neurons in each layer, fundamental principle can be derived from adaptive optics to sequentially compensate for wavefront distortion in each layer and alleviate accumulation of error. For correction of a current layer, DPU outputs are recorded in situ by using samples from a training set, and the DPU outputs are adopted as inputs of a next layer for in silico re-training of following diffractive layers. The error of a last layer is corrected by simply multiplying an energy distribution of output categories by decision coefficients, for example, 10 coefficients for ten categories, and optimization uses the same training schematic. The adaptive training process fine tunes the parameters of each diffractive layer to accommodate the model transfer error and effectively recovers the high inference accuracy.

Figure 2C:
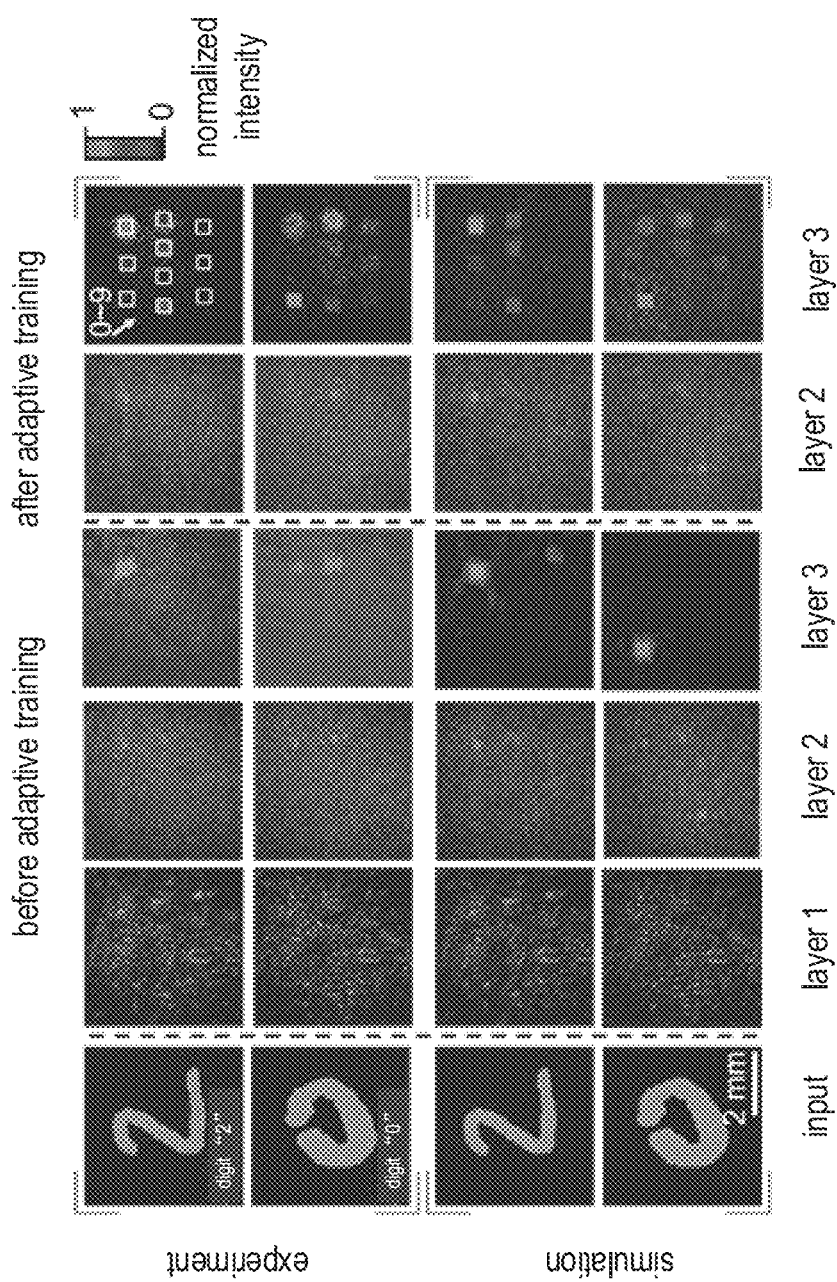
FIG. 2C is a schematic diagram illustrating experimental results of a diffractive deep neural network on an MNIST dataset according to embodiments of the disclosure.
Figure 2D:
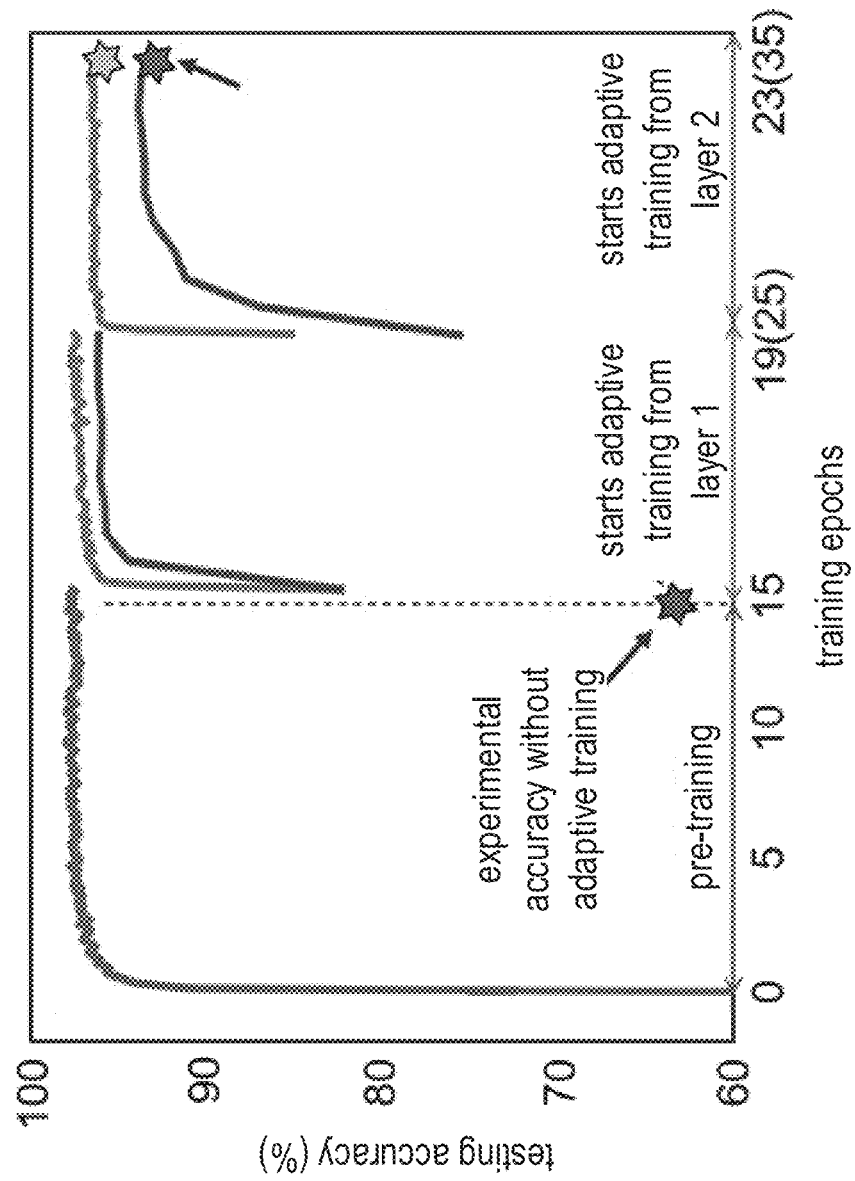
FIG. 2D is a schematic diagram illustrating convergence plots with adaptive training on an MNIST dataset according to embodiments of the disclosure.
Figure 2E:
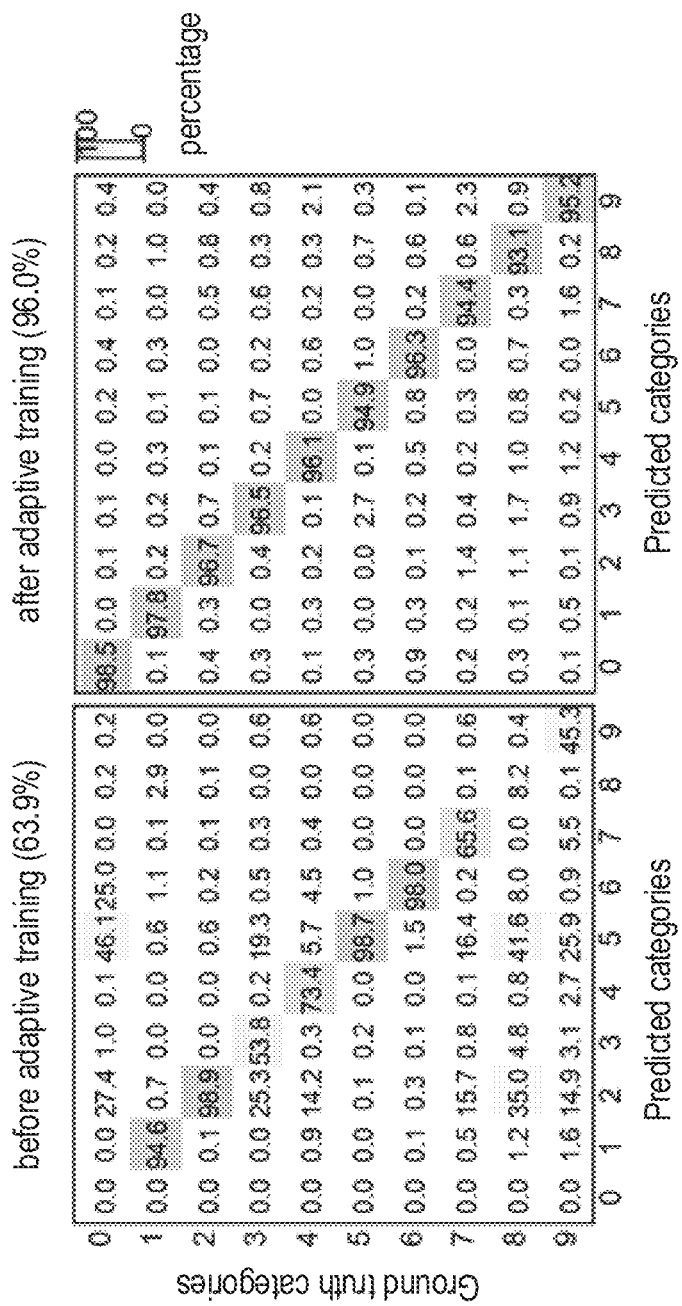
FIG. 2E is a schematic diagram illustrating an energy matrix and a confusion matrix of classification results of a diffractive deep neural network on an MNIST dataset according to embodiments of the disclosure.
Figure 2F:
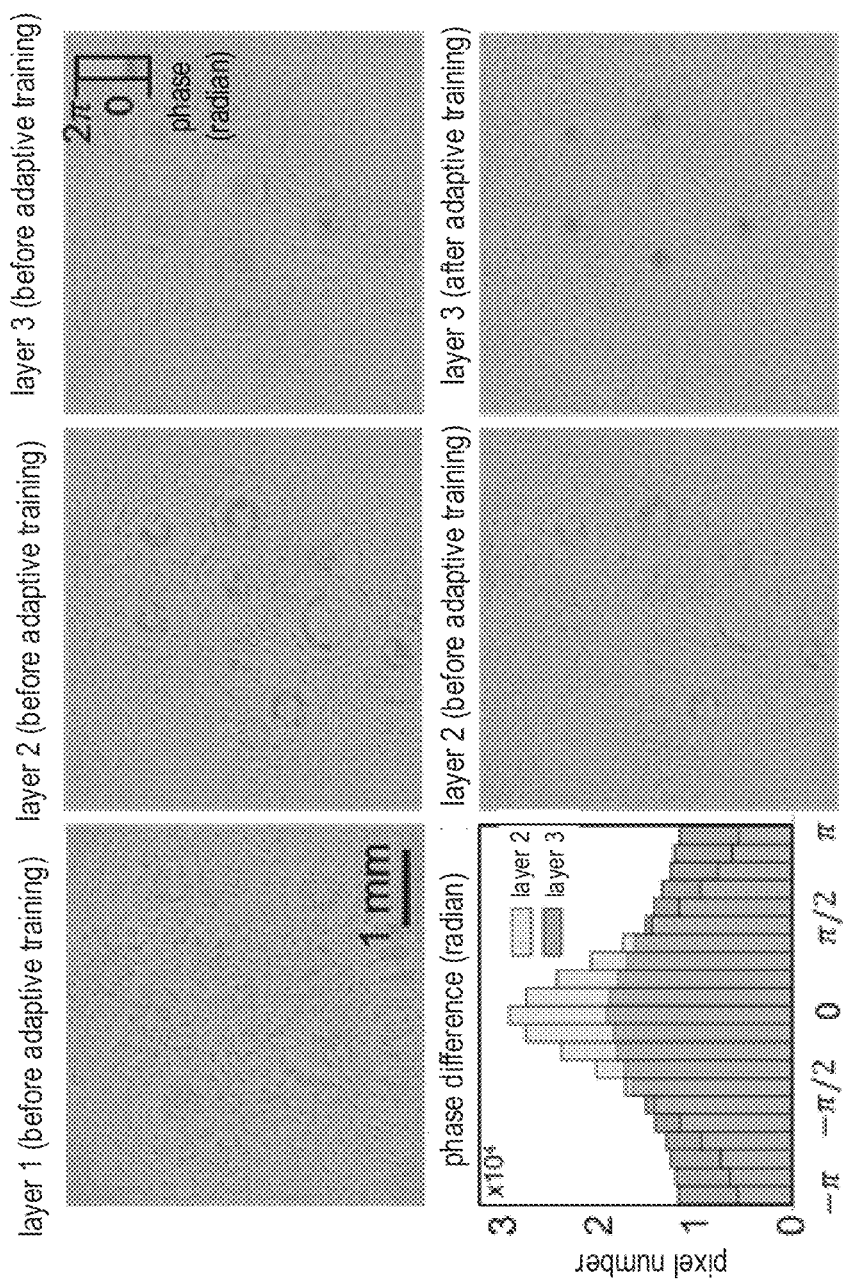
FIG. 2F is a schematic diagram illustrating diffractive phase masks of a diffractive deep neural network on an MNIST dataset according to embodiments of the disclosure.

As described above, the MNIST classification is performed by a three-layer optoelectronic $D^2NN$ (as illustrated in FIG. 2A). The $D^2NN$ can perform the operations at a rate of 56 fps. The model is trained in silico using an MNIST training set (including 55000 images) and achieves a blind-testing accuracy of 97.6% on 10,000 digit images in the test set. The training target is set to individually map input handwritten digits, from "0" to "9", into ten predefined regions on the output layer (i.e., layer 3), where a classification result is determined by finding the target region. The input and output samples are illustrated in FIG. 2C. Without the adaptive training, direct transfer of the pre-trained model to the optoelectronic system according to the disclosure may decrease recognition accuracy to 63.9% due to the accumulation of system errors layer by layer. As illustrated with examples number "2" and "0" from the test set (FIG. 2C, left and center), the layer error accumulation causes an intensity distribution of the DPU output at each layer to gradually deviate from that of the pre-trained model. This deviation may reduce the percentage of energy focusing on the target region and thus may result in an incorrect recognition category. For example, for the example digit "0", through the simulation, 90.8% of the energy is correctly concentrated to the zeroth region. However, the percentage of the energy is reduced to 5.5% during the experiment and is lower than 25.2% of the sixth output region. In this case, the example digit "0" will be misclassified as the digit "6". The confusion matrix (FIG. 2E, left) summarizes classification results of all instances in the MNIST test set, where the diagonal values represent percentage values corresponding to correct predictions for each category and the off-diagonal values represent percentage values corresponding to incorrect predictions for each category. The confusion matrix shows that transferring a direct model causes a large percentage of incorrect predictions and is particularly biased for digits whose percentage values corresponding to the correct predictions are less than 60%, such as "0", "3", "8" and "9".

To circumvent system error and improve recognition performance, adaptive training of the constructed three-layer optoelectronic $D^2NN$ is implemented with two-stage fine tuning of the pre-trained model. In details, a trade-off can be made between experimental accuracy and training efficiency by using a full training set and a mini-training set (for example 2% of the full training set). A first stage of adaptive training and a second stage of adaptive training of the DPU output of a first layer and a second layer are recorded. The first stage of adaptive training uses the experimentally measured output of the first layer as the input of the second layer, and the parameters of the second and third diffraction layers are retrained on the computer. In the same way, the experimentally measured output of the second layer is used for retraining the parameters of another third diffraction layer in the second stage of adaptive training. Each adaptive training stage is initialized with the pre-trained model to fine tune the network parameters under the same training settings. After each stage, the phase mode of the SLM will be updated accordingly with refined parameters to adapt to system defects and reduce the accumulation of system errors. Through the adaptive training, intensity distribution of the DPU outputs between simulations and experiments are well matched, especially in the last layer, During the experiments, the example test digits "2" and "0" are correctly classified (FIG. 2C, right). The convergence plot in FIG. 2B shows that by refining the parameters of the pre-trained model with experimentally measured layer outputs, the first and second stages of adaptive training improve the system error-induced testing accuracy from 82.1% to 97.4% and from 84.9% to 96.3% with the full training set (original plots), and improve from 82.1% to 95.9% and from 75.4% to 93.6% for the mini-training set (yellow plots). Despite the slightly lower accuracy, the mini-training set is more efficient, that is, 20 cycles with the mini-training set take about 3 minutes, while 15 cycles of pre-training (blue graph) using 3.8 hours. After the decision coefficient is multiplied by the adaptive training, the large model difference between simulations and experiments is overcome. The experimental testing accuracy is improved from 63.9% to 96.0% with the full training set, and to 93.9% with the mini-training set. Based on the confusion matrix illustrated in FIG. 2E, the correct prediction rates of the categories are improved and are all larger than 93%. A histogram of the phase differences between the diffractive layers before (FIG. 2F, top) and after (FIG. 2F, bottom right) adaptive training reflects the fine-tuning process of the second and third diffractive layers for adapting the system error (FIG. 2F, bottom left), where a large percentage of neurons have a small change in phase modulation value.

It is to be noted that the adaptive training is a training algorithm that matches the DPU, and its principle is not only applicable to the above-mentioned embodiments. In the following embodiments, the adaptive training is also adopted.

Third Embodiment

Figure 3A:
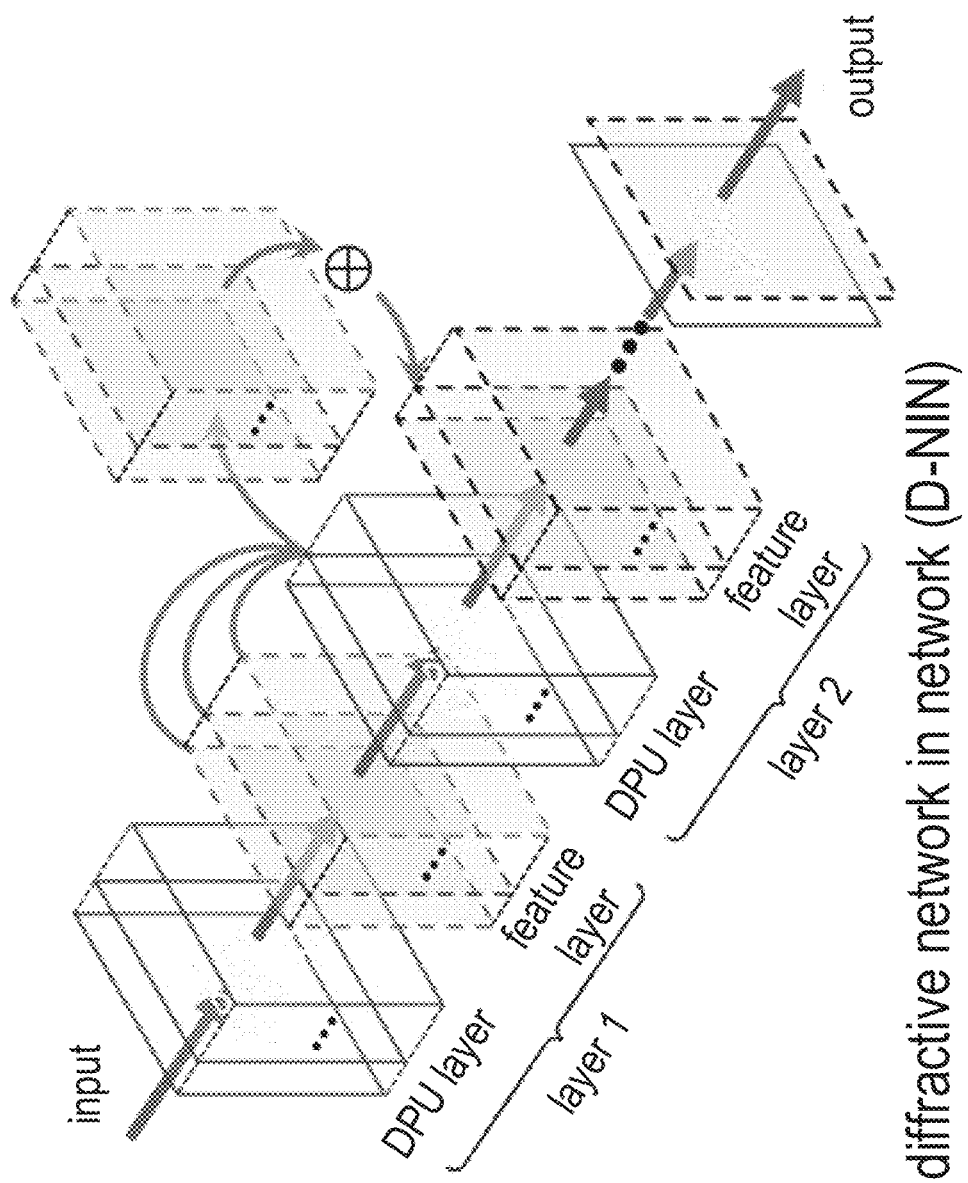
FIG. 3A is a schematic diagram illustrating a network structure of a diffractive network in network according to embodiments of the disclosure.
Figure 3B:
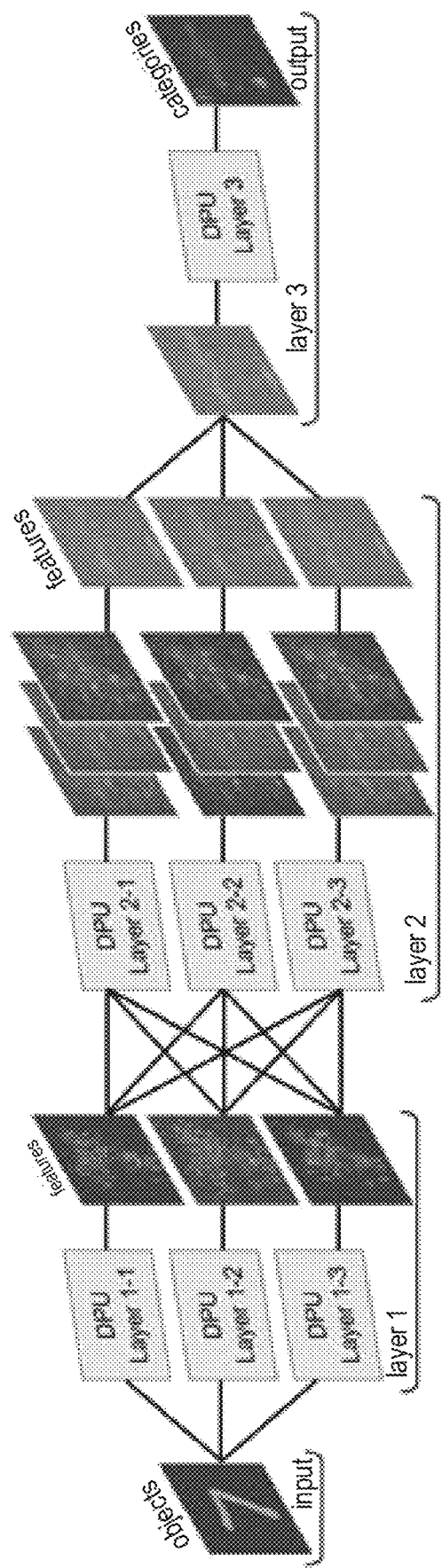
FIG. 3B is a schematic diagram of an illustration of working pipeline of a diffractive network in network according to embodiments of the disclosure.
Figure 3C:
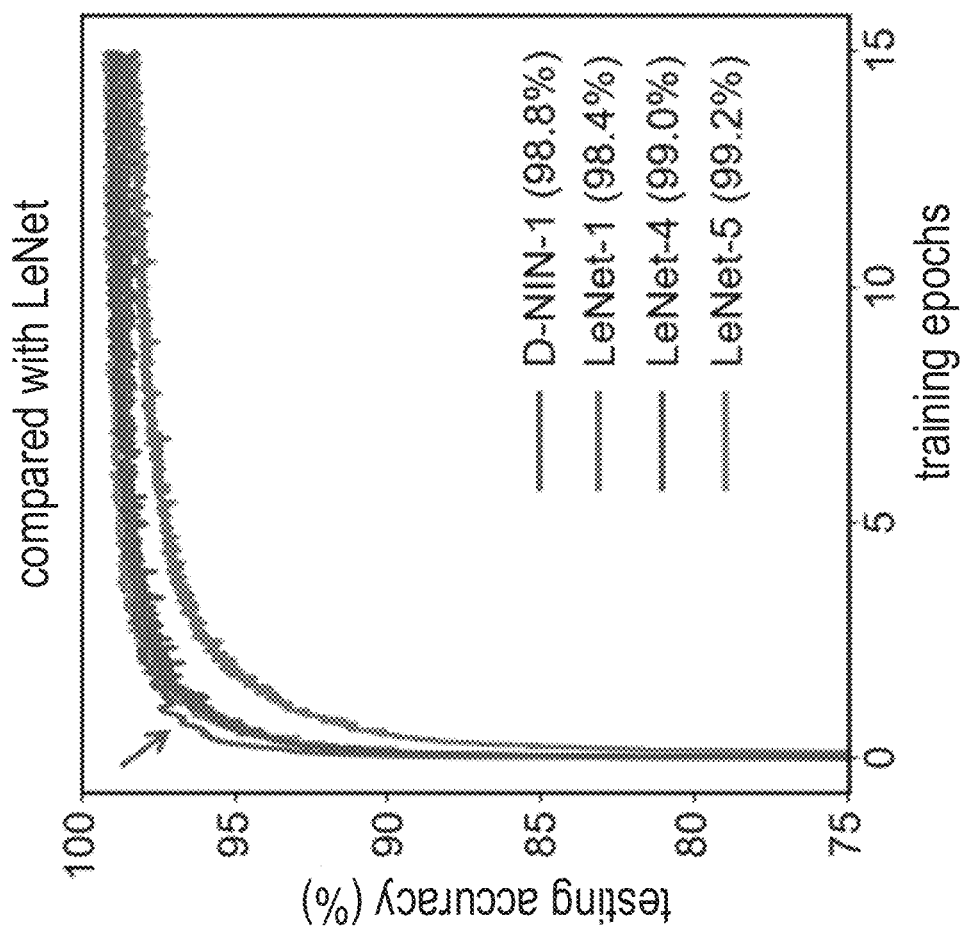
FIG. 3C is a schematic diagram illustrating a training accuracy of a diffractive network in network compared with LeNet according to embodiments of the disclosure.

In a convolutional neural network (CNN) architecture, segmenting the hidden layer into a set of feature maps with weight sharing is a key mechanism that leads to high model performance. Therefore, inference capability and mode robustness of the optoelectronic $D^2NN$ can be further enhanced by designing a multi-channel diffractive hidden layer as well as an external and internal interconnectivity structure (FIGS. 3A and 3B). Since the phase modulation of the unit input in the DPU is essentially equivalent to a complex convolution operation in the frequency domain, multiple DPU can be stacked to implement multiple diffractive feature maps on each hidden layer by stacking multiple DPUs. Each of the diffractive function map is generated by the high-speed cache and weighted summation of the DPU output and is set to share the same DPU layer to reduce network parameters and achieve efficient training. In the disclosure, the constructed architecture is called a diffractive network in network, or D-NIN-1. As each of the diffractive feature map is externally weighted and connected to all feature maps of a previous layer through the shared internal connectivity of the DPU layer. The internal neural network of the D-NIN-1 is implemented through the DPU That is, the DPU completely connects the input feature maps and the output feature maps through optical diffraction, which is different from the in silico diffractive network that uses multilayer perceptron as the internal connectivity. For fusing the multi-channel diffractive feature maps, the external connectivity diagram of the diffractive feature maps is used to perform the weighted summation of the DPU output on the input feature map of the previous layer. Given the complex internal and external neuron connectivity structure used to compute more abstract features of each hidden layer, the network outputs of the D-NIN-1 are obtained after a DPU read-out layer and used for final decision making.

The performance of the D-NIN-1 is evaluated by constructing a three-layer architecture as illustrated in FIG. 3B, the superior model accuracy and robustness of the D-NIN-1 over the three-layer $D^2NN$ (FIG. 2A) on the task of MNIST classification is demonstrated. The hidden layers of the D-NIN-1 (i.e., the layer 1 and the layer 2 in FIG. 3B) do not have a single diffractive feature map on each layer, but are configured with three diffractive feature maps respectively corresponding to the three DPU layers. With the same DPU settings and in silico simulation training procedures as with the $D^2NN$, the blind-testing model accuracy of the D-NIN-1 improves from 97.6% to 98.8%, surpassing the electronic CNN architecture LeNet-1. The comparison of model convergence plots between the D-NIN-1 and LeNet (including LeNet-1, LeNet-4 and LeNet-5) in FIG. 3B shows that, relative to training, the D-NIN-1 has the highest convergence speed (see the arrow). In addition, the model performance of the D-NIN-1 can be further boosted as D-NIN-1++, achieving an accuracy of 99.0%, which surpass LeNet-4, by integrating a low-complexity electronic fully connected layer at the end of the D-NIN-1. Although electronic computing operations are integrated at the end of the D-NIN-1++, optical computing still dominates. The ratio between the optical computing operations and the electronic computing operations is about $1.16 \times 10^6$, which guarantees the high performance in terms of computing speed and energy efficiency.

Figure 3D:
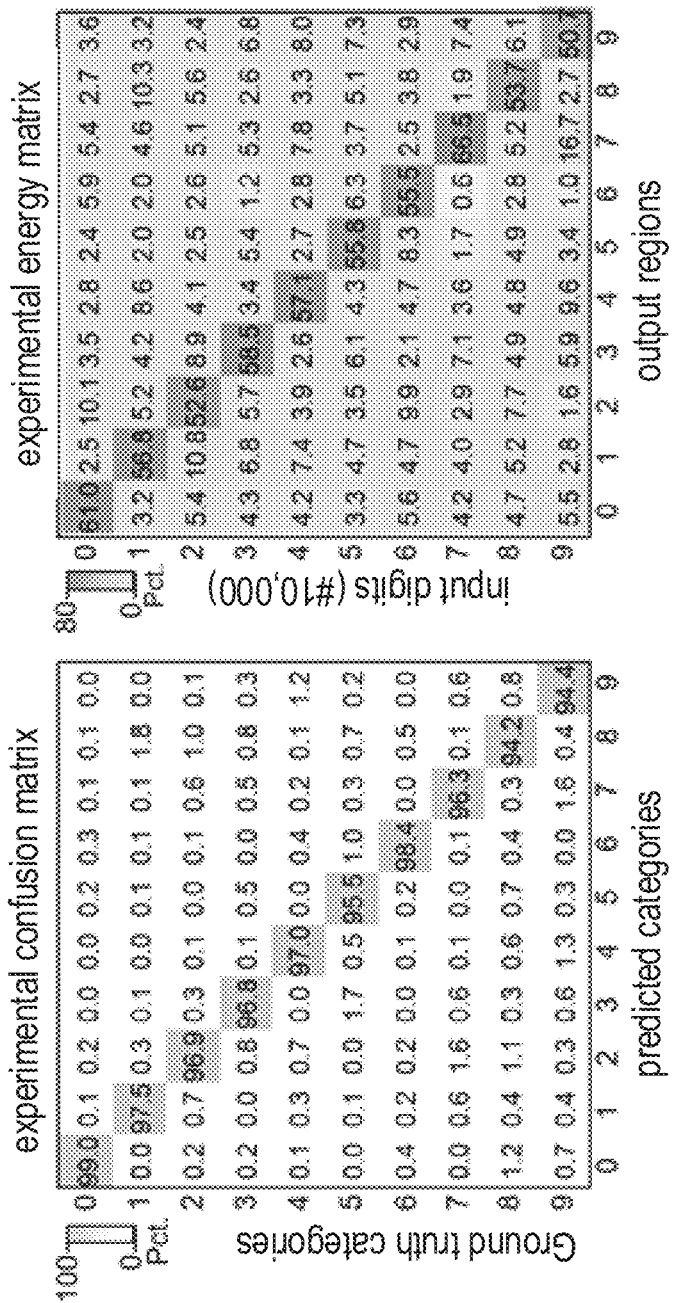
FIG. 3D is a schematic diagram illustrating an energy matrix and a confusion matrix of classification results of a diffractive network in network on an MNIST dataset according to embodiments of the disclosure.

Compared with the optoelectronic $D^2NN$, stacking multiple DPUs on each hidden layer can provide a higher degree of freedom and robustness to fine tune the pre-trained model of the D-NIN-1 to adapt to system defects. With the programming of the optoelectronic DPU system to deploy the D-NIN-1 model, the experimental classification accuracy over the whole test dataset reaches the blind-testing accuracy of 96.8% after the adaptive training. FIG. 3D summarizes the confusion matrices representing inference results of 10,000 test digits. Compared with the $D^2NN$, the D-NIN-1 improves the percentage of correct predictions for most categories, and the percentages of correct predictions are greater than 94% for all categories.

Figure 3E:
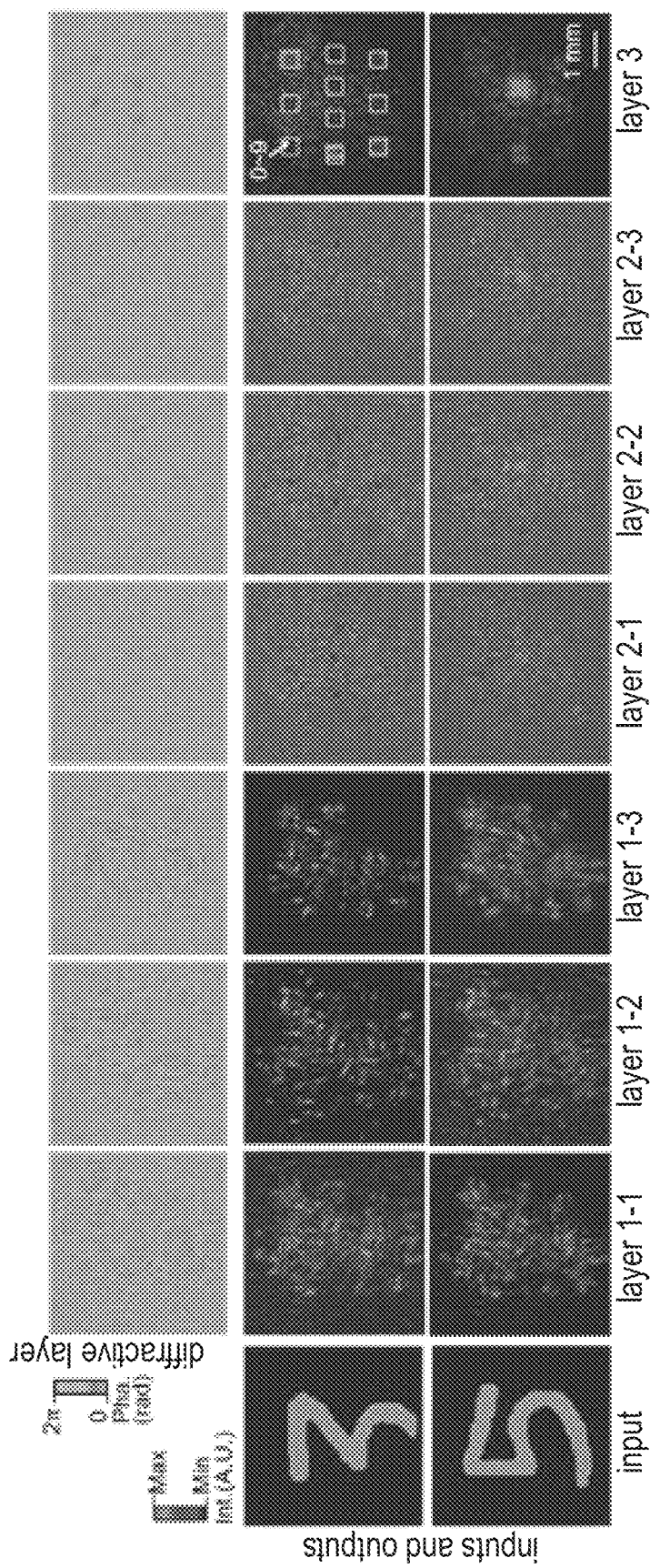
FIG. 3E is a schematic diagram illustrating experimental results of a diffractive network in network on an MNIST dataset according to embodiments of the disclosure.

In the disclosure, the energy distribution of ten predefined detection regions on the output layer is analyzed based on the inference result (FIG. 3D, right). As indicated by diagonal values of the energy matrix, an average energy percentage achieved by the D-NIN-1 on a respective target region of each category is greater than ~50.0%, which indicates that the network has successfully learned to generate the maximum energy on the correct position. The target regions of input digits (FIG. 3E, upper row) show phase modulation parameters of each DPU after adaptively training the constructed three-layer D-NIN-1. The middle and bottom rows of FIG. 3E respectively show the corresponding feature map of each layer and the classification results of the two example digits "3" and "5". The two example digits are misclassified by the $D^2NN$. That is, the digit "3" is misclassified as "8" since right and bottom outlines of these two digits are similar to each other, and the digit "5" is misclassified as "3" since the right and bottom outlines of these two digits are similar to each other. By contrary, the D-NIN-1 can make classification decisions by gradually abstracting more feature representations of the input digits, to correctly classifying these two digits. The experimental result shows that the maximum percentages of the energy distribution are 32.3% and 53.2%, and the energy is correctly concentrated in the third and fifth target regions respectively (FIG. 3E, last column).

Fourth Embodiment

Figure 4A:
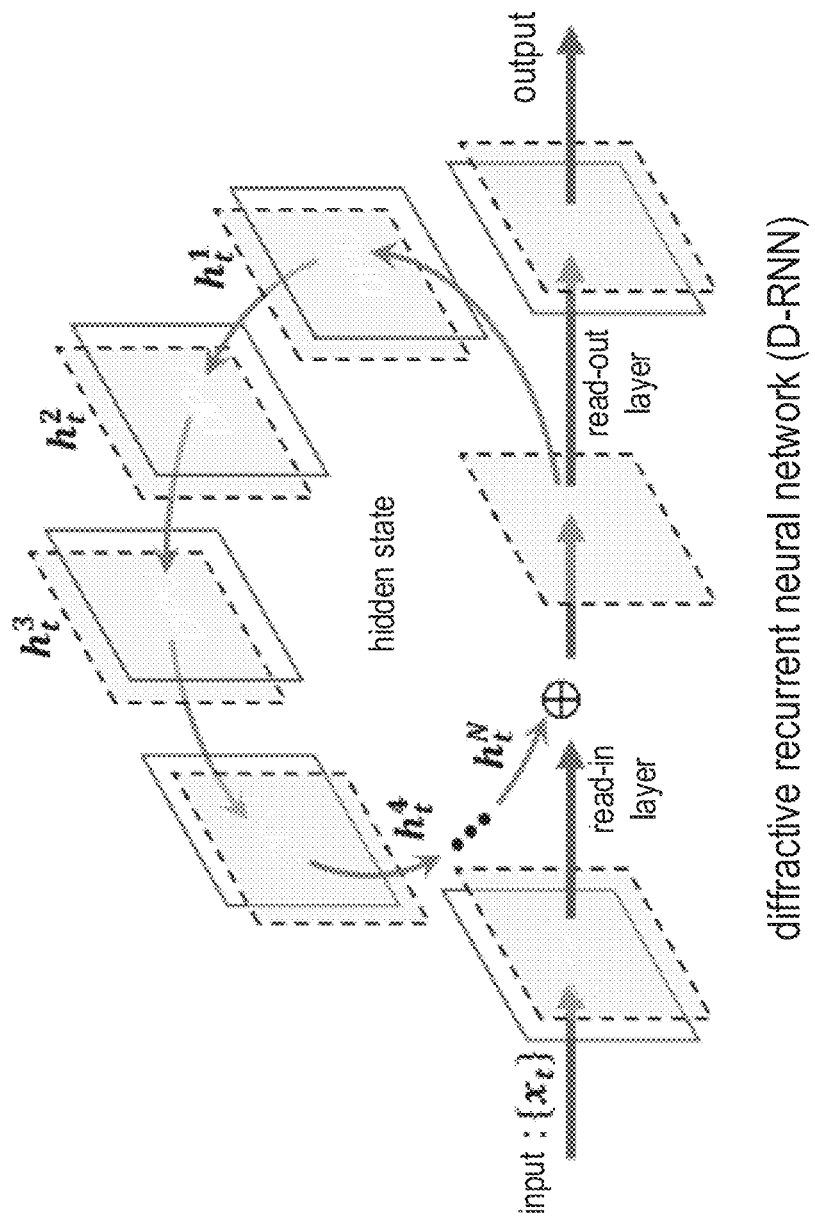
FIG. 4A is a schematic diagram illustrating a network structure of a diffractive recurrent neural network according to embodiments of the disclosure.
Figure 4B:
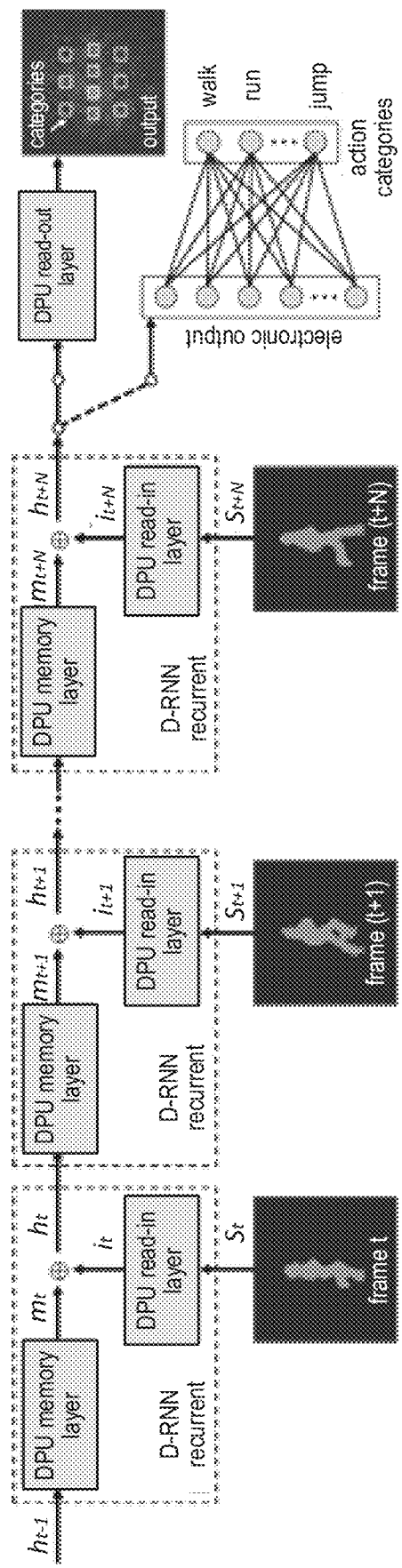
FIG. 4B is a schematic diagram of an illustration of a working pipeline of a diffractive recurrent neural network according to embodiments of the disclosure.

In addition to a single image, the reconfigurability of the DPU allows to construct a large-scale diffractive recurrent neural network (D-RNN) to perform high-accuracy recognition tasks of video sequences. To demonstrate its functionality, a standard RNN architecture is configured based on the recurrent connections of the DPU layers and is applied to the task of video-based human action recognition. The folded and unfolded representations of the proposed D-RNN are shown in FIG. 4A and FIG. 4B. FIG. 4A and FIG. 4B respectively include the temporal sequential connections of the input layers, the hidden layers, and the output layers with the shared diffractive parameters in time. The memory of input sequences is formed by generating diffractive hidden states at different time steps. For the D-RNN hidden layer at the time step oft, the hidden state is a function of the hidden state at the time step of (t−1) and of the input sequence $x_t$ at the time step of t. The states from these two sources are fused through an affine combination, that is $h_t=\lambda f_1(h_{t-1})+(1-\lambda)f_2(x_t)$, where $m_t=f_1(h_{t-1})$ denotes the memory state mapping from $h_{t-1}$, $i_t=f_2(x_t)$ denotes the input state mapping from $x_t$, and $\lambda \in (0,1)$ is a fusion coefficient for controlling strengths of the memory state with respect to the input state. Complexity of the mapping function $f_1(\cdot)$ and $f_2(\cdot)$ can be increased by using multiple DPU layers, forming a spatial deep hidden layer structure in addition to the temporal depth architecture of the D-RNN, as illustrated in FIG. 4A. In FIG. 4B, considering the recognition speed of the system according to the disclosure and the complexity of the task, these two functions are implemented by a single DPU layer, which operates the system at a reading rate of about 70 fps. The last hidden state of D-RNN, summarizing characteristics of the input sequence, is extracted and read out with the DPU or electronic output layer to generate a category output distribution for determining the action categories.

The constructed D-RNN for the task of human action recognition is evaluated on two benchmark databases (i.e., the Weizmann database and the KTH database) with pre-processing to adapt to the network input. The Weizmann database includes ten types of natural actions, i.e., bend, jumping-jack (jack), jump-forward-on-two-legs (jump), jump-in-place-on-two-legs (pjump) run, gallop-sideways (side), skip, walk, wave-two-hands (wave 2) and wave-one-hand (wave 1). Sixty video sequences (actions) are sued as a training set, and thirty video sequences (actions) are used as a test set. Each video sequence has about 30 to 100 frames respectively. The KTH database includes six types of natural actions, i.e., boxing, handclapping, handwaving, jogging, running, and walking. Each of the video sequences includes about 350 to 600 frames. The system 36 is trained and tested by using a first scene (150 video sequences) and 16:9 data splitting. The recurrent connection of the hidden layer at different time steps allows the D-RNN to process a variable sequence length of inputs. Although a longer network sequence length (larger N) can incorporate more frames for the recognition decisions this causes difficulties for the network in training as well as the forgetting of long-term memory, that is, the vanishing of frame information at a time step that is far from the current time step. Therefore, for each video sequences in the database with a length of M, setting N<<M and the video sequence is divided into numbers of sub-sequences with the same length as N, with which the D-RNN is trained and tested. In the disclosure, the model accuracy is quantitatively evaluated with two metrics, i.e., frame accuracy and video accuracy. The frame accuracy can be obtained by statistically summarizing the inference results of all sub-sequences in the test set. The video accuracy is calculated based on the predicted category of each video sequence in the test set and is derived by applying the winner-takes-all strategy (the action category with the most votes) on the testing results of all sub-sequences in the video sequence.

Figure 4C:
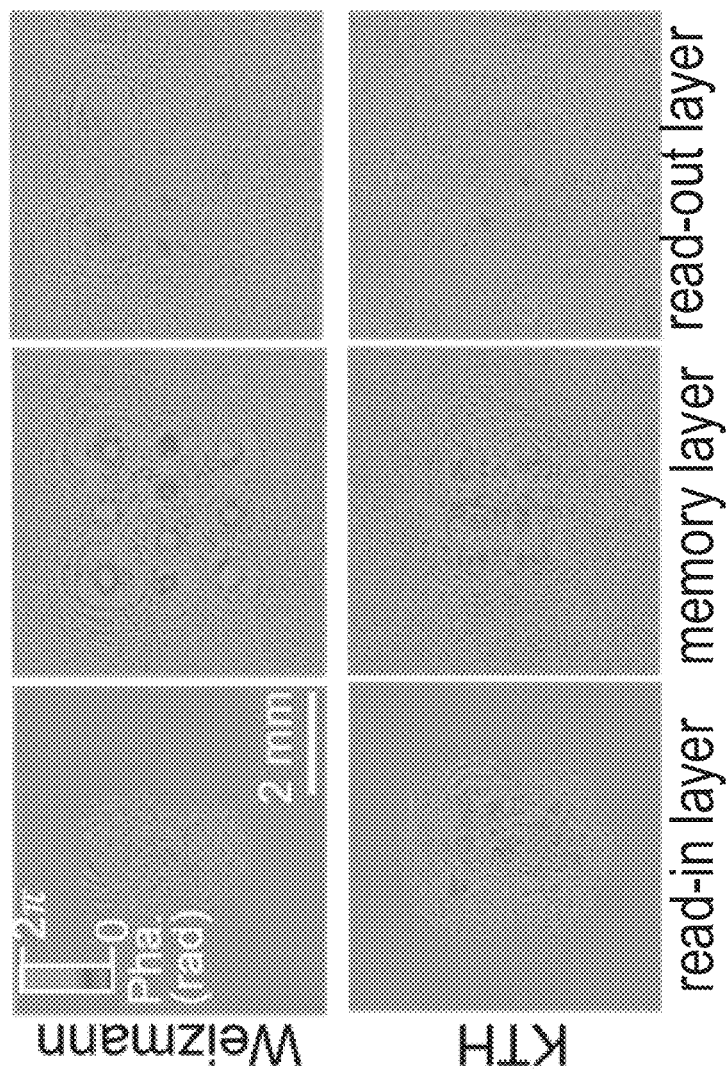
FIG. 4C is a schematic diagram illustrating diffractive phase masks of a diffractive recurrent neural network on human action datasets according to embodiments of the disclosure.

Through controlled variable experiments and performance analysis, the network sequence lengths are set to 3 and 5 respectively for the Weizmann and KTH databases, and serial numbers of sub-sequences in each video sequence are 10 to 33 and 70 to 120, respectively. The D-RNN architecture is evaluated by configuring the DPU read-out layer and pre-trained with the optimal fusing coefficient of 0.2 for both the Weizmann and KTH databases, to achieve the blind-testing frame accuracy of 88.9%, corresponding to the video accuracy of 100% and 94.4% respectively for the two modes. To implement the model experimentally, the adaptive training is performed by fine tuning the modulation coefficients of only the read-out layer due to the recurrent connection inherence of the D-RNN. The designed modulation coefficients of the memory, read-in and read-out DPU layers after the adaptive training are illustrated in FIG. 4C, where the upper and lower rows correspond to the models of the Weizmann and KTH databases, respectively. Compared with the experimental results without the adaptive training, the adaptive training improves the experimental frame accuracy from 51.0% to 82.9% and the experimental video accuracy from 56.7% to 96.7% for the Weizmann database. Similarly, after the adaptive training, the experimental frame accuracy is increased from 53.8% to 85.1% and the experimental video accuracy from 55.6% to 94.4% respectively for the KTH database. Without the adaptive training, the hidden layers of D-RNN may accumulate system errors at different time steps, which reduces the experimental recognition accuracy. However, the adaptively trained DPU read-out layer can extract the retention temporal information of the sub-sequences and restore the model accuracy.

Figure 4D:
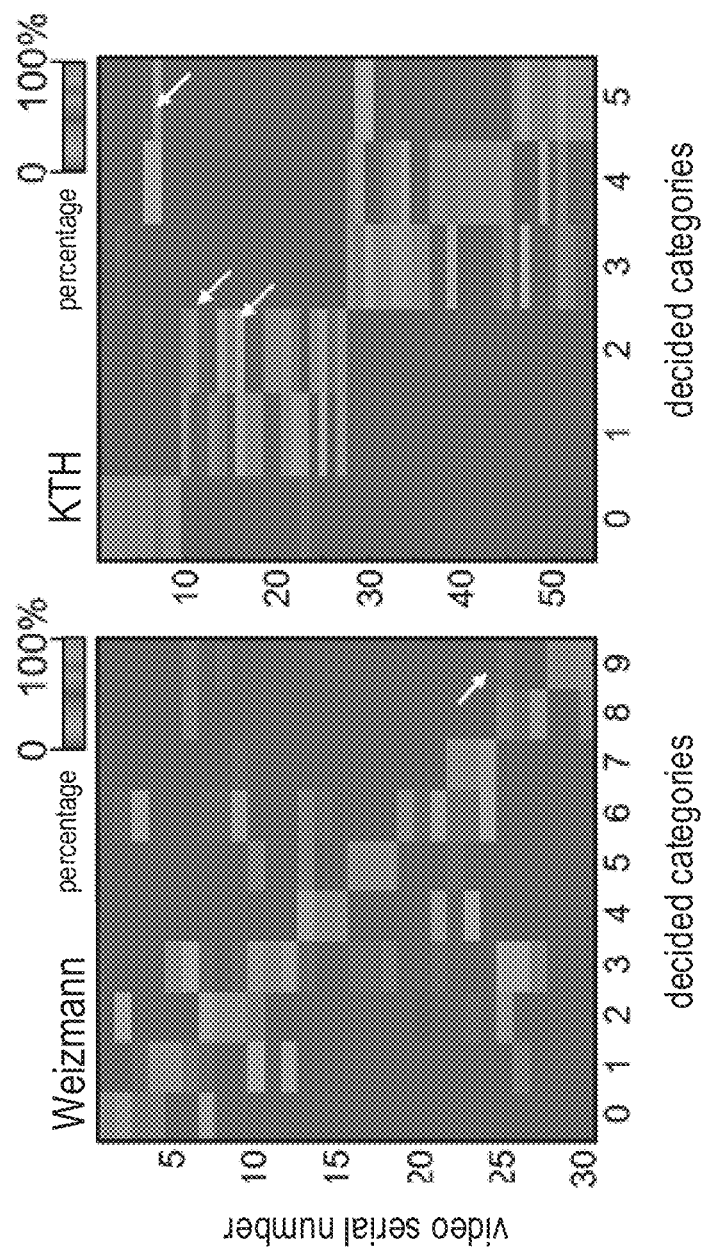
FIG. 4D is a schematic diagram illustrating a classification accuracy of videos with a diffractive recurrent neural network on human action datasets according to embodiments of the disclosure.
Figure 4E:
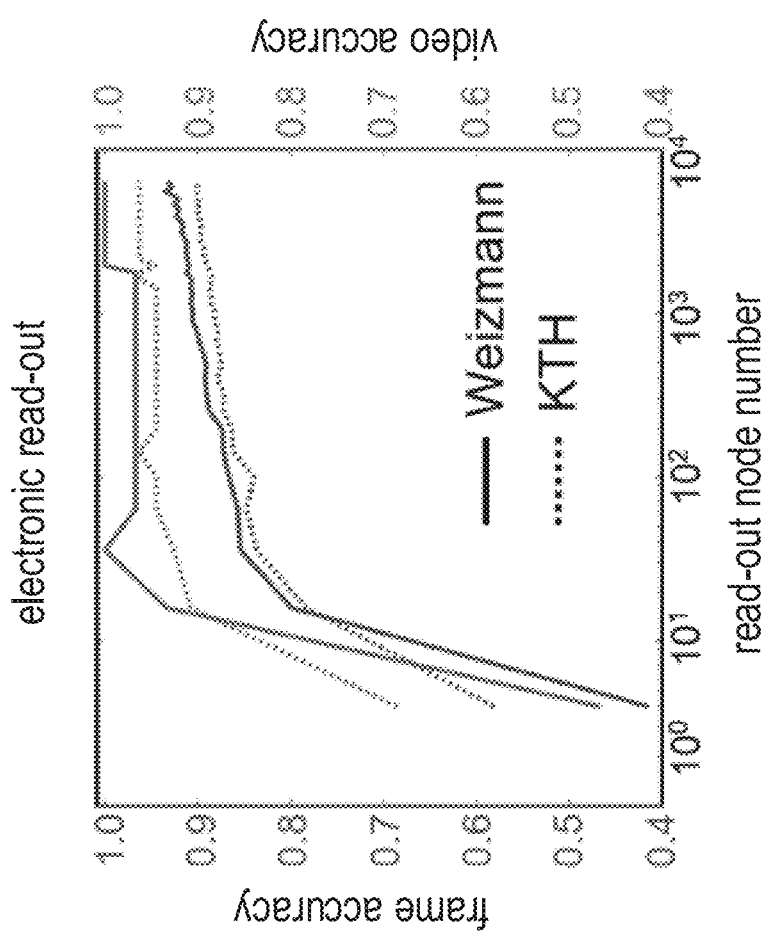
FIG. 4E is a schematic diagram illustrating a classification accuracy of a diffractive recurrent neural network on human action datasets with different read-out node number according to embodiments of the disclosure.
Figure 4F:
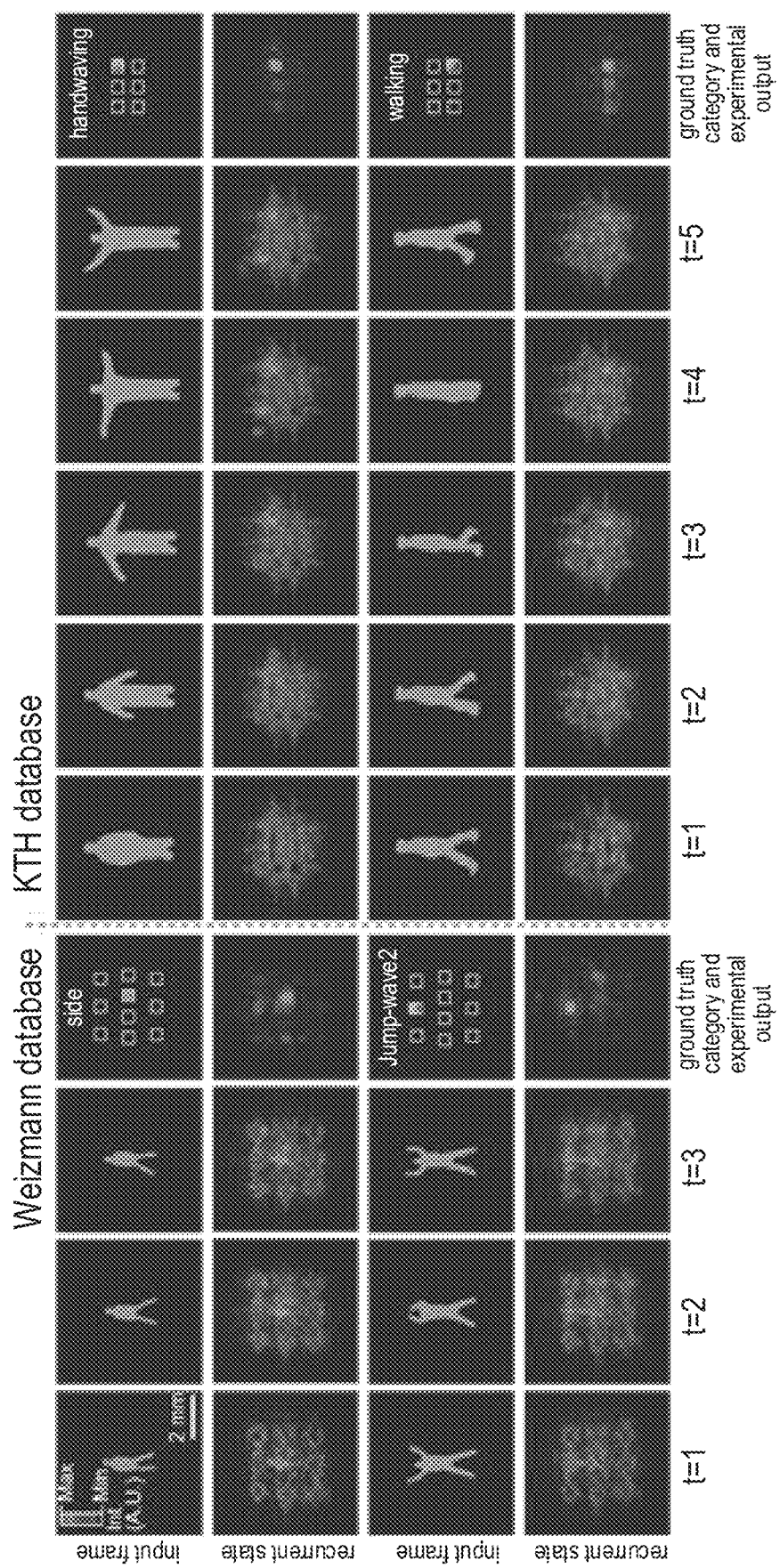
FIG. 4F is a schematic diagram illustrating experimental results of a diffractive recurrent neural network on human action datasets according to embodiments of the disclosure.

The experimental testing results of all sub-sequences are visualized with the categorical voting matrix in FIG. 4D by calculating the percentage of votes for all categories in each testing video sequence, where the category with the maximum percentage of the vote represents the predicted category of a video sequence. The target testing video sequences are ranked in order with respect to the video categories such that the diagonal positions of the two categorical voting matrices represent the correct predictions. The experimental results show the mis-categorization of one video sequence (that is, the $25^{th}$) and three video sequences (that is, the $6^{th}$, the $11^{th}$ and the $15^{th}$), marked with white arrows, for the Weizmann (FIG. 4D left) and the KTH (FIG. 4D, right) databases respectively. In addition, for the KTH database, the prediction of the subsequence between actions with higher degree of similarity, such as handclapping and handwaving (the category labels 1 and 2) is more incorrect (FIG. 4D, right). Four example testing result are illustrated in FIG. 4F, including gallop-sideways (side) and jumping-jack (jack) from the Weizmann database (FIG. 4F, left), as well as handwaving and walking from the KTH database (FIG. 4F, right). At different time steps of t, the D-RNN hidden layer uses the sequential read-in of input frames $x_t$ to gradually update its output state. These input frames generate the input state of the input subsequence (the first to the last second column of FIG. 4F, left and right). The pre-defined output regions are used in the training process, namely ten regions for the Weizmann database and six regions for the KTH dataset respectively. Each region corresponds to a category. The DPU output layer reads the hidden state of the input subsequence and correctly classifies four exemplary sub-regions. The maximum energy generated by the target region is ranked (the last column of FIG. 4F, left and right).

The recognition accuracy and robustness of the D-RNN can be further enhanced, forming the D-RNN++ architecture, by transferring the trained D-RNN hidden layer and using the electronic read-out layer to replace the DPU read-out layer (FIG. 4B, right). Inspired by the read-out modality of reservoir computing, an electronic linear fully connected read-out layer is used, taking the last hidden state as the input nodes that is fully connected to the output action category nodes. The fully connected weight between read-out nodes and the category nodes is learnt with a ridge regression algorithm. The redundancy of the hidden state can reduce the complexity of the electronic read-out layer, that is, reducing the number of read-out nodes, by average pooling the last hidden state. The experimental frame accuracy and the experimental video accuracy of the D-RNN++ relative to the number of read-out nodes are evaluated, as illustrated in FIG. 4E. The results demonstrate that the D-RNN++ achieves an experimental video accuracy of 100% and 96.3% under the optimized number of electronic read-out nodes of 2500 for the Weizmann database and the KTH (first scene) database respectively. Implementing the low-complexity electronic read-out layer has a slight influence on the ratio of the optical computing operation of the D-RNN, and the proportional relationship of the computing efficiency is retained. In addition, the experimental video accuracy of the D-RNN++ for categorizing the Weizmann database and the KTH (first scene) database achieves a comparable performance to or even outperforms the state-of-the-art electronic computing methods (the accuracies are 100% and 96.0% respectively).

Fifth Embodiment

The computing speed and energy efficiency of the DNN architecture constructed by the DPUs according to the disclosure are determined, and the values are determined from a total number of computing operations (including optical and electronic computing operations) based on time and (system) energy consumption.

The number of optical operations: the total number of optical computing operations (OP) in the DPU including the following three parts, i.e., light field modulation, diffractive weighted connections, and complex nonlinear activation. In the computing process, the number of complex-number operations of the DPU are converted into the number of real-number operations. Each complex-number multiplication includes 4 real-number multiplications and 2 real-number summations, and each complex-number summation includes 2 real-number summations. Given the number of input nodes and the number of output neurons are both set to K, the optical field modulation and the complex nonlinear activation both have K complex-number multiplications. Each complex-number multiplication corresponds to 6K actual operations. Physical diffractive weighted connections between the input nodes and the output neurons have $K^2$ complex-number multiplications and (K−1) K complex-number summations, which correspond to 2K (4K−1) actual operations. Therefore, the total number of actual operations for the optical computing in the DPU is: $R_d$=2K (4K−1)+ 6K+6K=2K (4K+5) OP.

The number of electronic operations: the DPU electronically allocates some computing operations in the following three aspects, to flexibly control the dataflow during network configuration. (1) Through the optoelectronic implementation, the basic binary quantization of the unit input requires 2K actual operations, including threshold computing and numerical quantification. (2) For configurations of the D-NIN-1 and the D-RNN architecture, each external connection to the DPU needs K real-number multiplications, and the connections need K real-number summations therebetween. (3) The electronic fully connected read-out layer has $K_r$=(2$K_1$−1)$K_2$ real-number operations, where $K_1$ denotes the number of read-out nodes and $K_2$ denotes the number of category nodes.

The total number of operations: $R_t$=$R_o$+$R_e$. Under the network settings as described above, the optical operations and the electronic operations are denoted as $R_o$ and $R_e$ respectively. $R_o$=Q·$R_d$, where Q is the number of temporal multiplexing of the DPU layer, and $R_d$ is an optical operation of each DPU. For the $D^2$NN and D-NIN-1 (++), K=560× 560. For the D-RNN (++), K=700×700. For the D-NIN-1, $K_1$=196, $K_2$=10. For the D-RNN with the Weizmann database, $K_1$=2500 and $K_2$=10. For the KTH database, $K_1$=2500 and $K_2$=6.

The computing speed of the DNN architecture constructed by the DPU can be expressed as:

$$v = \frac{R_t}{\tau_t} = \frac{R_o + R_e}{Q\tau_c} \approx \frac{R_d}{\tau_c} \quad (1)$$

where $\tau_t$=Q$\tau_c$ represents the total duration of the computing, $\tau_c$ is the duration of each cycle of the DPU workflow, and $R_e$<<$R_o$. $\tau_o$=Q·$\tau_d$ denotes the duration of different network architectures for processing the total optical operation $R_o$, where $\tau_d$ represents the duration of processing an optical operation $R_d$ by the DPU layer. Then, the energy efficiency can be expressed as:

$$\eta = \frac{R_t}{E_t} = \frac{R_o + R_e}{E_o + E_e} = \frac{R_o + R_e}{P_o \cdot \tau_o + R_e/\eta_e} \approx \frac{R_o}{R_e}\eta_e \quad (2)$$

where $E_t$=$E_o$+$E_e$ represents the energy consumption of the computing operation, $E_o$=$P_o$·$\tau_o$ represents the energy consumption of the optical operations, $P_o$ is the power of a light source, $E_e$=$R_e$/$\eta_e$ represents the energy consumption of the electronic operations, and $\eta_e$ is the energy efficiency of the electronic computing processor. Through the optoelectronic implementation of the DPU system, the power consumption of the incident light measured by a silicon optoelectronic sensor is 1.4 μW, i.e., $P_o$=1.4 μW. For the $D^2$NN and the D-NIN-1, $\tau_c$=5.9 ms and $\tau_d$=4.4 ms. For the D-RNN, =7.1 ms and $T_d$=5.5 ms. Since the electronic operations of the DPU system are all performed by Intel® Core™ i7-5820K CPU @ 3.30 GHz, the computing speed $v_e$=188.5 GOPs/s, the power consumption $P_e$=140.0 W, and the energy efficiency $\eta_e$=$v_e$/$P_e$=1.3 GOPs/J. Therefore, the computing energy efficiency of the DPU system is approximately $R_o$/$R_e$ times higher than that of the electronic computing processor. The energy efficiency of the system can be determined by further considering the energy consumption of the programmable optoelectronic device:

$$\eta_{sys} = \frac{R_t}{E_t} = \frac{R_o + R_e}{E_o + E_e + E_{dev}} = \frac{R_o + R_e}{P_o \cdot \tau_o + R_e/\eta_e + P_{dev} \cdot \tau_t} \quad (3)$$

where $E_t$=$E_o$+$E_e$+$E_{dev}$ represents the total energy consumption of the DPU system with different architectures, $E_{dev}$ and $P_{dev}$ are the total energy consumption and power consumption of optoelectronic device, respectively. The power consumption of the sCMOS sensor is about 30.0 W, the SLM is 10.0 W, and the DMD is 6.1 W.

Based on the above n method, the table in FIG. 5 summarizes the computing speeds and energy efficiencies of different architectures. The state-of-the-art advanced graphics computing equipment Nvidia Tesla V100 has a peak computing speed of 30 TOPs/s and a computing power consumption of 300 W (0.1 TOPs/J). Compared with this device, the DPUC system according to the disclosure can achieve a computing speed larger than that of the Nvidia Tesla V100 by more than 4 times and a computing efficiency larger than that of the Nvidia Tesla V100 by more than 25 times.

In the description of this specification, descriptions with reference to the terms "one embodiment", "some embodiments", "examples", "specific examples", or "some examples" etc. mean specific features, structures, materials, or features described in conjunction with embodiments or examples are included in at least one embodiment or example of the disclosure. In this specification, the schematic representations of the above terms do not necessarily refer to the same embodiment or example. In addition, the described specific features, structures, materials, or features can be combined in any one or more embodiments or examples in a suitable manner. Furthermore, those skilled in the art can combine different embodiments or examples and features of different embodiments or examples described in this specification without any contradiction.

In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include at least one feature. In the specification of the disclosure, "plurality" means at least two, such as two, three or more, unless otherwise specifically defined.

Any process or method description in the flowchart or described in other ways herein can be understood as a module, segment or part of codes that includes one or more executable instructions for implementing logic functions or steps of the process. The scope of the preferred embodiment of the disclosure includes additional implementations, which may not be in the order shown or discussed, including performing involved functions in a substantially simultaneous manner or in the reverse order, which should be understood by those skilled in the art.

The skilled in the art can understand that all or part of the steps of the method of the foregoing embodiments can be implemented by a program instructing relevant hardware. The program can be stored in a computer-readable storage medium. When the program is executed, one or a combination of the steps of the method embodiment can be executed.

Further, the functional units in various embodiments of the disclosure may be integrated into one processing module, or each unit may exist alone physically, or two or more units may be integrated into one module. The above-mentioned integrated modules can be implemented in the form of hardware or software functional modules. If the integrated module is implemented in the form of a software function module and sold or used as an independent product, it may also be stored in a computer readable storage medium.

The aforementioned storage medium may be a read-only memory, a magnetic disk or an optical disk. Although embodiments of the disclosure are shown and described above, it can be understood that the above-mentioned embodiments are exemplary and should not be construed as limiting the disclosure. Those skilled in the art can make changes, modifications, substitutions, and modifications on embodiments within the scope of the disclosure.

What is claimed is:

1. A optical diffractive processing unit, comprising:
   input nodes;
   output nodes;
   neurons, connected to the input nodes through optical diffractions, wherein weights of connection strength of the neurons are determined based on diffractive modulation, each optoelectronic neuron is configured to perform an optical field summation of weighted inputs and generate a unit output by applying a complex activation to an optical field occurring naturally in a photoelectronic conversion, and the neurons are formed by a programmable device;
   the programmable device comprises an optical neural network containing a digital micromirror device, a spatial light modulator, and a photodetector;
   the digital micromirror device is configured to provide a high optical contrast for information coding;
   the spatial light modulator is configured to perform the diffractive modulation, wherein weighted connections between the input nodes and the neurons are implemented by free-space optical diffraction, and a receiving field of each neuron is determined by an amount of diffraction from a plane of the spatial light modulator to a plane of the photodetector; and
   the photodetector is configured to implement the optical field summation and the complex activation.

2. The optical diffractive processing unit of claim 1, wherein the optical neural network comprises multiple single-layer diffractive layers, and each single-layer diffractive layer comprises an input coding layer, a diffractive connection layer, an optical summation layer, and an optical non-linearity layer.

3. The optical diffractive processing unit of claim 2, wherein the input coding layer is implemented by a programmable input module configured to encode input data into incident light, a physical dimension of encoding comprises amplitude encoding, phase encoding or both the amplitude encoding and the phase encoding, and an encoding type comprises discrete encoding, continuous encoding, or both the discrete encoding and the continuous encoding.

4. The optical diffractive processing unit of claim 2, wherein the diffractive connection layer is implemented by optical diffraction.

5. The optical diffractive processing unit of claim 2, wherein the optical summation layer is implemented by optical coherence.

6. The optical diffractive processing unit of claim 2, wherein the optical non-linearity layer is implemented by a programmable detection module.

7. The optical diffractive processing unit of claim 2, wherein the single-layer diffractive layers are connected sequentially.

8. The optical diffractive processing unit of claim 1, wherein the optical neural network comprises a three-layer optoelectronic diffractive deep neural network ($D^2NN$).

9. The optical diffractive processing unit of claim 1, wherein the optical neural network comprises recurrent modules;
   an output of each recurrent module is a recurrent state;
   an input of each recurrent module comprises an output state of a previous recurrent module and sequential input data;
   each recurrent module comprises multiple states inside; and
   another diffractive neural network architecture is connectable to a recurrent neural network during an inference process.

* * * * *